June 1, 1926.  1,586,940
J. S. BLACKIE
DITCHING MACHINE
Filed Sept. 1, 1925    3 Sheets-Sheet 1
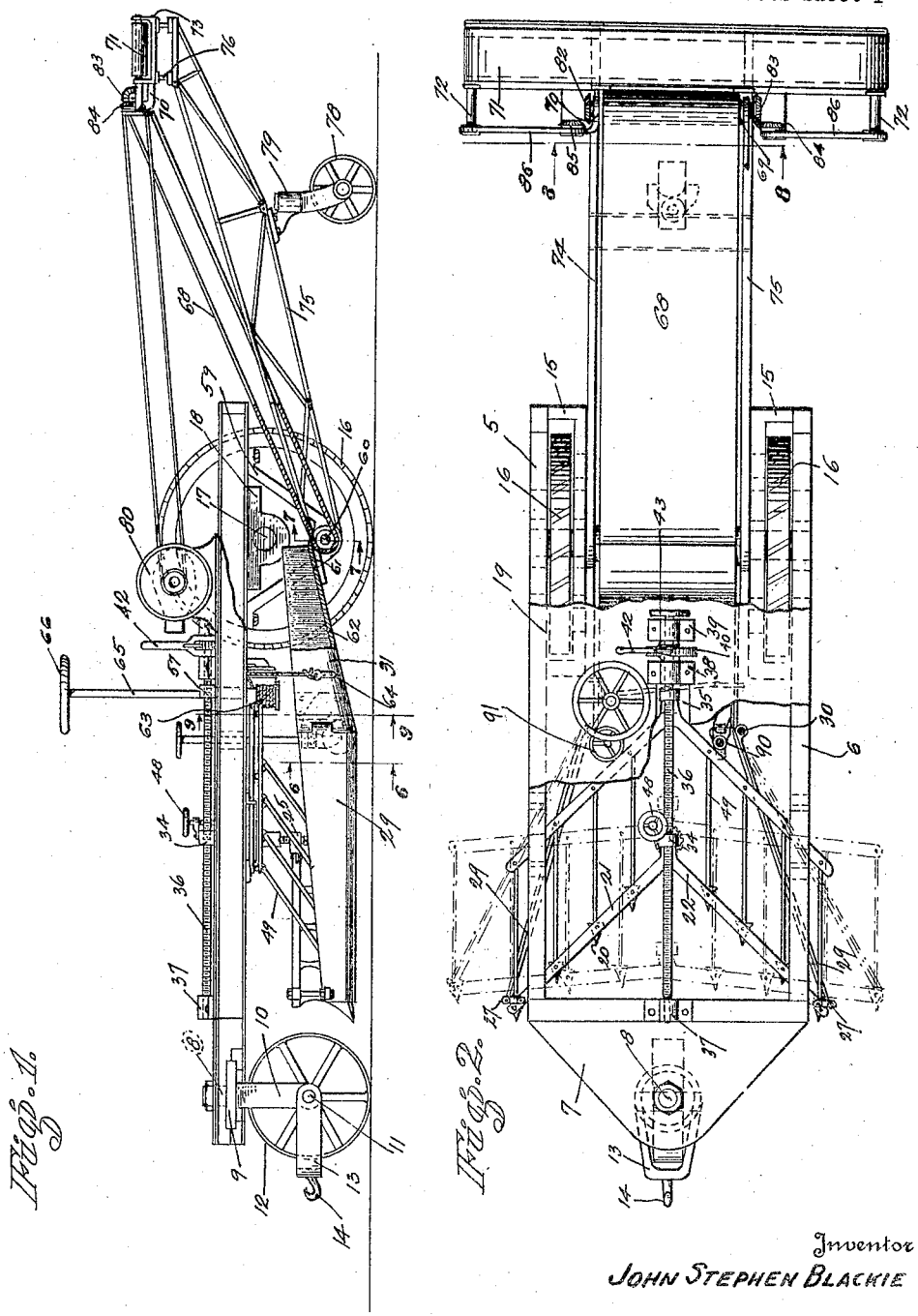
Inventor
JOHN STEPHEN BLACKIE
By
Attorneys.

June 1, 1926.  1,586,940
J. S. BLACKIE
DITCHING MACHINE
Filed Sept. 1, 1925  3 Sheets-Sheet 2
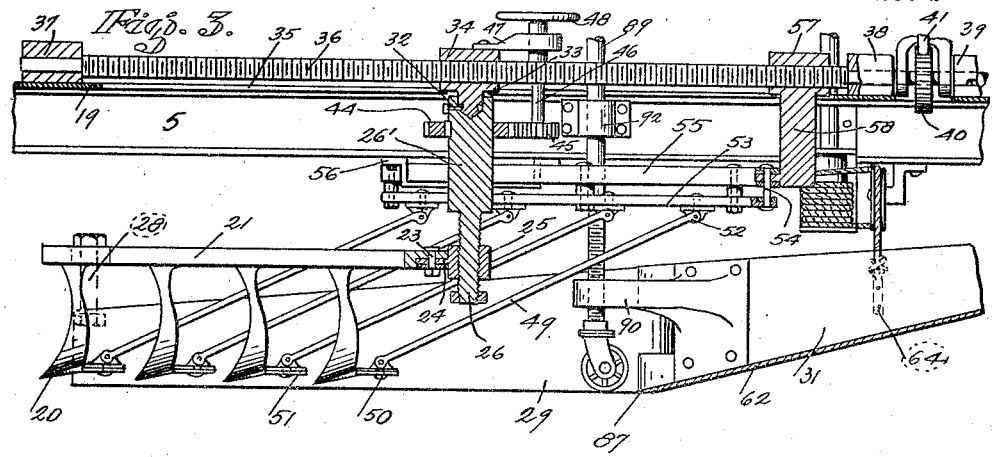
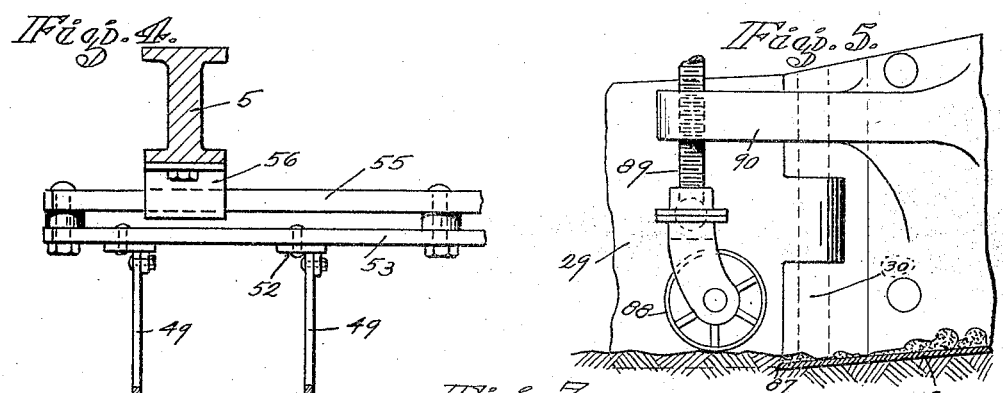
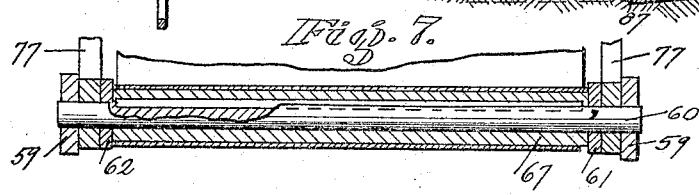
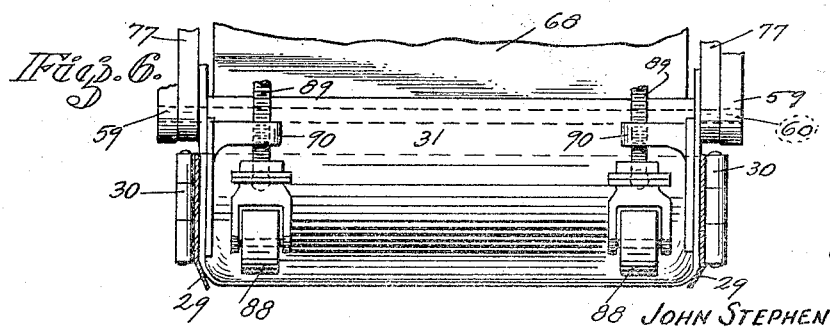
Inventor
JOHN STEPHEN BLACKIE
By
Attorney June 1, 1926.
J. S. BLACKIE
1,586,940
DITCHING MACHINE
Filed Sept. 1, 1925
3 Sheets-Sheet 3
Fig. 8.
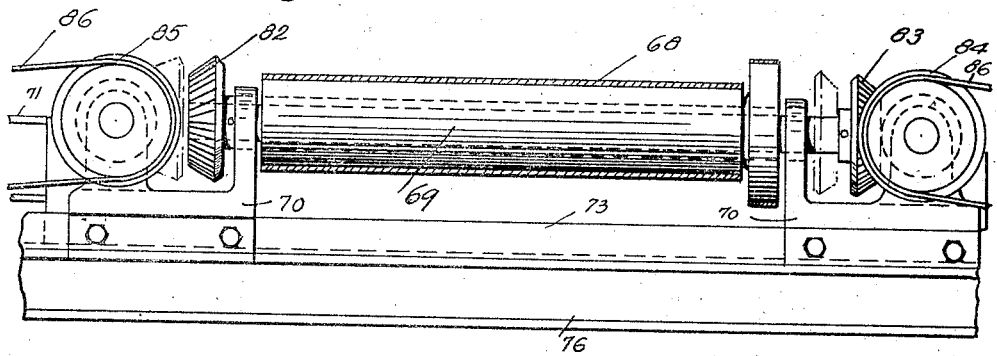
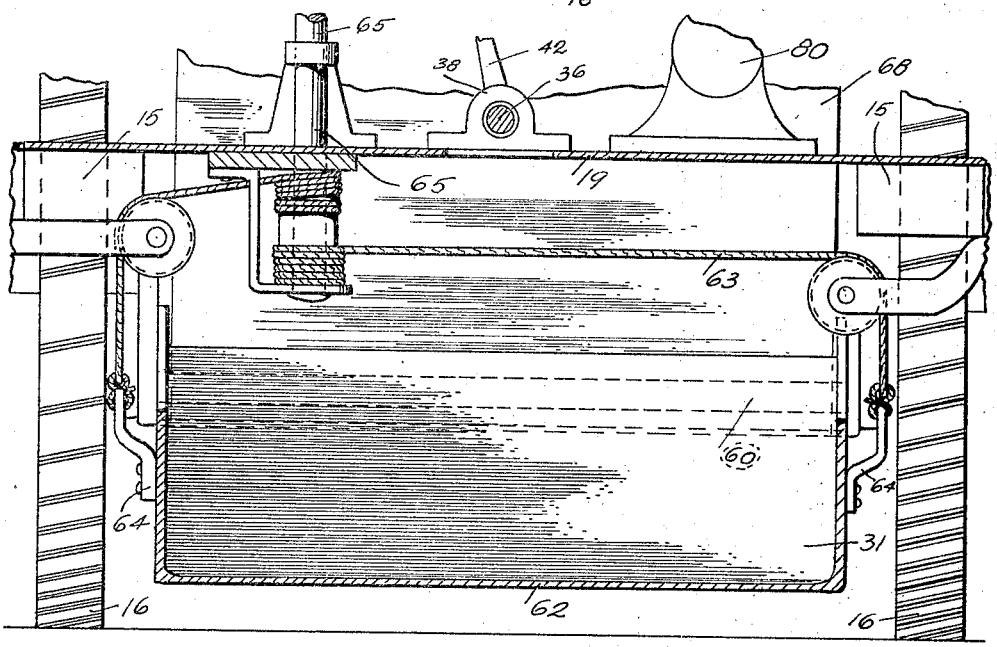
Fig. 9.
Inventor
JOHN STEPHEN BLACKIE
By
Attorneys.

Patented June 1, 1926.

1,586,940

UNITED STATES PATENT OFFICE.

JOHN STEPHEN BLACKIE, OF YUBA CITY, CALIFORNIA.

DITCHING MACHINE.

Application filed September 1, 1925. Serial No. 53,876.

The present invention relates to improvements in ditching machines of a type shown in my prior Patent No. 861,080, of July 23rd, 1907, and which are chiefly usable for digging irrigation ditches.

The present invention proposes certain improvements or refinements of the structure in the patent referred to above, and chief among these are a wheeled frame with a relatively short wheel base in order to permit of turning the device around in a relatively small circle; a more uniform disposition of the weight supported by the wheeled frame so as to avoid accidental tilting or lifting of one end of the device when the same is in use; an improvement in the draft line so that the machine may be pulled by draft animals or a tractor without requiring attention on the part of the operator to steer the machine; an improved mounting for the digging mechanism and a connection between the digging mechanism and the side scrapers adapted to automatically adjust the side scrapers simultaneously with the adjustment of the diggers.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a side elevation of my improved ditching machine showing a part thereof in section and broken away to show the relation and construction of other parts.

Figure 2 is a plan view of the machine shown in Figure 1.

Figure 3 is an enlarged detail vertical longitudinal section taken through the intermediate portion of the wheeled frame and showing the mounting and operating mechanism for the digger and scoop or scraper.

Figure 4 is an enlarged detail showing one side of the frame in vertical cross-section and the connection between the frame and one of the brace rods.

Figure 5 is an enlarged detail partly in side elevation and vertical longitudinal section of one end portion of the scoop or scraper, together with the means for limiting the penetration of the ground by the scraper.

Figure 6 is a detail cross-section taken approximately on the line 6—6 of Figure 1.

Figure 7 is a detail cross-section approximately on the line 7—7 of Figure 1.

Figure 8 is a cross-section on the line 8—8 of Figure 2.

Figure 9 is a cross-section approximately on the line 9—9 of Figure 1.

The opposite side members 5 and 6 of the main frame are disposed horizontally and parallel and are formed of any material found suitable for the purpose, as, for instance, metal I-beams. The forward end portions of the members 5 and 6 converge and are connected together by a plate 7 which has an opening in the central line of the frame for a spindle 8 to which is rigidly secured a disk 9 that is rotatably mounted in a bearing underneath the plate 7, and which terminates in its lower end portion in a yoke 10, the side portions of which are provided with bearings for a shaft 11 which forms a support for a wheel 12 disposed between the sides of the yoke and operating to hold the forward end of the frame elevated above the ground. The shaft 11 also forms a support for a horizontally disposed U-shaped draft bar 13 which has a hook 14, or its equivalent, for connection to a draft line or the like which in turn is connectible either to draft animals or a tractor. The rear end portions of the side members 5 and 6 are provided on their opposed inner faces with horizontally disposed U-shaped pieces 15 through which extend the rear traction wheels 16 which are mounted upon spindles, one of which is shown in Figure 1 and indicated by 17, each of such spindles having its ends disposed in boxes 18 depending from the adjacent U-shaped piece 15 and the adjacent side member of the frame, the wheels 16 operating to hold the rear end of the frame in elevated position above the ground. A platform in the form of flooring 19 is disposed upon the upper face of the frame and secured to the opposite sides thereof. The plow points 20 of the digging apparatus depend from two plow beams 21 and 22 which are pivotally connected at one end by a bolt 23 which passes through a lug 24 extending radially from a nut 25. The nut 25, together with the digging mechanism, is disposed underneath the frame, and the nut 25 is in vertical alinement with the longitudinal middle line of the frame. The nut is vertically adjustable by the screw threaded portion 26 of a vertically disposed shaft 26' upon which the nut is threaded, the vertical adjustment being provided for elevating and lowering the plow points 21 from and into engagement with the ground. The outer ends of the plow beams 21 and 22 are provided with laterally extending lugs 27 which are connected by pivot pins 28 to the forward outer ends of a pair of relatively thin and oblong side scrapers 29 which are proportioned in width so as to extend below the plow beams. The side scrapers are arranged upright on one of their longitudinal edges and slope inwardly and have their inner ends hingedly connected for lateral swinging movement as at 30 to the opposite sides of a scoop or scraper 31 which is fixedly secured against endwise movement. The upper end portion of the shaft 26' swivels as at 32 upon a circular shoulder 33 depending from the side of a horizontally disposed nut 34 which extends through a medially disposed longitudinal recess 35 in the platform 19 of the frame. A shaft provided with a screw threaded portion 36 is disposed horizontally and above the recess 35 and the nut 34 is screwed upon the shaft so as to be moved thereby in the direction of the length of the frame. One end of the shaft is rotatably mounted in a bearing 37 at one end of the slot and the opposite end portion of the shaft is similarly mounted in a pair of spaced bearings 38 and 39 disposed beyond the other end of the slot and between which is arranged a ratchet wheel 40 keyed to the shaft and operable to turn in one direction by a pawl 41 carried by an actuating handle 42 which has one end portion bifurcated and disposed on opposite sides of the ratchet wheel 40 and loosely mounted upon the shaft. In operating the handle to turn the ratchet in one direction, the screw threaded portion 36 of the shaft advances the nut toward the front end of the frame and in moving the nut 34 carries with it the shaft 26' whose connection with the plow beams 21 through the screw threaded portion 36 changes the angular relation of the plow beams 21 and also the angular relation of the side scrapers 29, so that the forward ends of the plow beams and side scrapers move outwardly and in opposite directions with respect to the frame. In this way the plow beams are adjusted to the width of cut desired and the side scrapers are adjusted to gather the intervening soil between the outermost plow points and deflect the same inwardly to the scoop of scraper 31.

A hand wheel 43 upon one end of the screw threaded shaft is provided for manipulating the shaft to turn in a direction to restore the plow beams and the side scrapers to their normal positions when the pawl 41 is disengaged from the ratchet wheel 40.

A toothed wheel 44 keyed to the shaft 26' and meshing with a toothed wheel 45 operates to rotate the shaft 26' to raise and lower the plow points 20 together with the beams 21. A vertically disposed shaft 46 serves as a carrier for the toothed wheel 45 and has bearings in a bracket 47 carried by the nut 34. A hand wheel 48 at the upper end of shaft 46 is provided for operating the shaft 46 and the devices connected thereto for raising and lowering the plow points. A plurality of brace rods 49 are connected at one end, as indicated at 50, for lateral and vertical swinging movement upon two shoes 51 extending rearwardly from the plow points 20 and operate to brace the plow points together with the plow beams against the resistance of the ground to the plow points in passing therethrough. The rods 49 slope upwardly and rearwardly and the upper rear ends are connected for lateral and vertical swinging movements, as indicated by 52, to the lower portions 53 of a pair of angularly disposed brace bars which converge at a point in vertical alinement with the longitudinal middle line of the frame and at which point they are pivotally connected by a pin 54. The upper portions 55 of the brace rods which are spaced from the lower portions 53 have their outer end portions slidable through and supported by U-shaped hangers 56 depending from the opposite side members 5 and 6 of the frame, to which they are rigidly secured.

A nut 57 upon the screw threaded portion 36 of the shaft is operated by the latter to move simultaneously with the nut 34 and this nut 57 has a depending extension 58 which is connected to the pivot pin 54 at the connected ends of the brace bars to operate these to follow the movements of the plow beams 21 so that the plow points 20 when in any of their adjusted positions are braced by the rods 49.

A pair of oppositely disposed depending V-shaped brackets 59 are fixedly secured to the undersides of the side members 5 and 6 of the frame and the lower ends provide bearings for a transversely disposed supporting spindle 60 on the opposite end portions of which are turnably mounted brackets 61 which are secured to the opposite corner portions of the bottom 62 of the scoop or scraper 31, which bottom inclines downwardly and forwardly as shown in Figure 1. A flexible element such as a rope 63 is employed for adjusting the scoop vertically to compensate for vertical adjustments of the side scrapers 29 and the opposite end portions of the element 63 are connected to lugs 64 on the outer faces of the side walls of the scoop. The intermediate portion of the flexible element is coiled around a vertically disposed drum at the lower end of a shaft 65 which is journaled in the platform 19 and extends vertically upward and is provided with an operating wheel 66.

A roller 67 disposed upon spindle 60 is extended through the lower end of an endless conveyor 68 which inclines upwardly and rearwardly and beyond the rear end of the frame, and is extended around an upper roller 69. The ends of the upper roller are journaled in oppositely disposed brackets 70 and the upper end of the endless conveyor 68 is arranged in discharging relation to another endless conveyor 71 disposed at right angles to the conveyor 68. The opposite ends of the conveyor 71 extend beyond the opposite sides of the conveyor 68 so that material deposited upon the conveyor 71 by the conveyor 68 may be directed to either side. The opposite ends of the conveyor 71 are disposed around rollers 72 which are supported in brackets 73 at the upper end of a frame whose side members 74 and 75 are inclined upwardly and rearwardly and are connected at their upper ends to transversely disposed I-beams 76 to which the brackets 73 are connected. The lower end portions of the side members 74 and 75 of the conveyor supporting frame are turnably mounted upon the opposite end portions of the spindle 60, as indicated by 77 in Figure 7, and the said supporting frame is held in its upwardly inclined position by casters 78 rotatably mounted in brackets 79 secured to the side members 74 and 75.

A hydrocarbon motor 80 mounted upon the rear end portion of the main frame has a pulley which is connected by a belt to a pulley on the upper roller 69 so as to operate the endless conveyor 68. The shaft of the upper roller is splined and terminally provided with beveled gear wheels 82 and 83. Beveled gear wheels 84 and 85 are supported by brackets and have hub portions which are connected to extensions of the shafts 72 at the ends of the transverse carrier 71 by belts 86. When the shaft of the upper roller is moved in one direction manually, the beveled gear wheel on one end of the roller will mesh with the adjacent beveled gear wheel and the other beveled gear at the opposite end of the roller will be moved from engagement with the beveled gear wheel adjacent thereto. In this way the transverse conveyor 71 may be operated to discharge material in either direction.

In Figure 1 the plow points together with the side scrapers and scoop are shown in elevated or inoperative position. When the parts are adjusted into operative position, they appear as shown in Figure 3. There it will be noted that the lower edge of the side scraper shown is disposed approximately in a plane with the plow points 20 and the lower forward edge 87 of the scoop is flush with the lower edge of the side scraper. In this adjustment of the parts the lower edge of the bottom 62 of the scoop penetrates the ground for a definite distance, as shown in Figure 5, and the material is moved upwardly upon the bottom by the forward movement of the machine and finally discharged upon the endless conveyor 68 and conveyor 71. As will be noted by reference to Figures 1 to 3 inclusive and also Figures 5 and 6, a pair of caster wheels 88 are disposed a trifle in front of the lower edge 87 of the bottom 62 and adjacent to the opposite side portions of the scoop. These caster wheels are provided with screw threaded shanks 89 which are screwed through forwardly extending lugs 90 upon the opposite inner faces of the sides of the scoop, the said screw threaded shanks terminating in shafts 90 which extend upwardly through the platform and are provided with hand wheels, one of which is shown in Figure 2 and indicated by 91. The upper portions of the shafts are journaled in bearings, one of which is shown in Figure 3 and indicated by 92 disposed underneath the platform.

As shown in Figures 3 and 5, the caster wheels are adjustable into contact with the surface of the ground and when so positioned prevent downward tilting of the scoop in a direction that would result in directing the lower edge 87 thereof into contact with the uncut portion of the ground. In this way the machine may be pulled through the cut ground with a minimum of effort and without danger of obstruction by engagement between the lower edge of the bottom of the scoop and the uncut portion of the ground.

Although I have shown and described one embodiment of my invention, it is to be understood that the same is susceptible of various changes; and I reserve the right to employ such as may come within the scope of the appended claims.

I claim:

1. A ditching machine comprising a wheel mounted frame, a plow carrying beam supported by the frame and consisting of sections pivotally connected at their inner ends, means for changing the angle of said sections to vary the width of cut, and side scrapers connected to the frame and to the said sections and movable therewith.

2. A ditching machine comprising a wheel mounted frame, a plow carrying beam adjustably supported by the frame and consisting of two sections pivotally connected at their meeting ends, plow points extended downward from the beam, means for changing the angle of said sections to vary the width of cut, means for adjusting the beam vertically to raise and lower the plow points with respect to the surface of the ground, and side scrapers connected to the frame and to the sections of the plow beam and movable angularly and vertically therewith.

3. A ditching machine comprising a wheel mounted frame, a plow beam consisting of two sections pivotally connected together, plow points extended downwardly from said sections, a brace bar rearward of the beam and consisting of two pivotally connected sections, brace rods extended from said bar and pivotally connected to the plow points, means for moving said brace bar and plow beam simultaneously in either direction to vary the width of the cut, and side scrapers disposed rearwardly of the plow points and underneath the brace bar and connected to the sections of the plow beam and movable angularly therewith.

4. A ditching machine comprising a wheel mounted frame, digging devices carried by the frame, a scoop arranged rearward of said digging devices and side scrapers interposed between the scoop and the digging devices and pivotally connected at their opposite ends to the said digging devices and scoop.

5. A ditching machine comprising a wheel mounted frame, vertically adjustable digging devices carried by said frame, a vertically adjustable scoop arranged rearward of the digging devices, said scrapers connected at one end of the digging devices and pivotally connected at their opposite ends to opposite sides of the scoop and vertically adjustable together with the scoop and the digging devices.

6. A ditching machine comprising a wheel mounted frame, a plow carrying beam consisting of two sections pivotally connected together at their meeting ends, plow points depending from the sections of the plow beam, a brace bar consisting of two sections pivotally connected together at their meeting ends and disposed rearward of the plow beam and connected to the plow points, a shaft rotatably mounted upon the frame and above the plow beam and the brace bar and having a screw threaded portion, screw threaded members disposed upon the screw threaded portion of the shaft and movable thereby in either direction, said members being connected to the plow beam and to the brace bar for changing the angle of the beam and the bar members transversely of the frame, and side scrapers permanently connected at one end to sections of the plow beam and movable angularly therewith.

7. A ditching machine comprising a wheel mounted frame, an endless conveyor supporting frame including a pair of oppositely disposed side members pivotally connected at one end to the rear portion of the wheel mounted frame and extending upwardly and rearwardly at an incline to a point above and rearwardly beyond the said rear portion of the wheel mounted frame, a transversely disposed connection between the upper ends of the side members, caster wheels connected to the intermediate portions of the side members for supporting the same in their normal upwardly inclined positions, endless conveyor mechanism carried by the conveyor frame, digging mechanism connected to the wheeled frame and a scoop depending from the wheeled frame for conveying material from the digging mechanism to the conveying mechanism.

JOHN STEPHEN BLACKIE.